United States Patent
Chirca et al.

(10) Patent No.: US 8,732,551 B2
(45) Date of Patent: May 20, 2014

(54) MEMORY CONTROLLER WITH AUTOMATIC ERROR DETECTION AND CORRECTION

(75) Inventors: Kai Chirca, Richardson, TX (US); Timothy D. Anderson, Dallas, TX (US); Amitabh Menon, Lewisville, TX (US)

(73) Assignee: Texas Instruments Incoporated, Dallas, TX (US)

( * ) Notice: Subject to any disclaimer, the term of this patent is extended or adjusted under 35 U.S.C. 154(b) by 315 days.

(21) Appl. No.: 13/237,917

(22) Filed: Sep. 20, 2011

(65) Prior Publication Data

US 2012/0072796 A1 Mar. 22, 2012

Related U.S. Application Data

(60) Provisional application No. 61/387,367, filed on Sep. 28, 2010, provisional application No. 61/384,932, filed on Sep. 21, 2010.

(51) Int. Cl.
*G11C 29/00* (2006.01)

(52) U.S. Cl.
USPC .............. 714/764; 714/777; 713/193

(58) Field of Classification Search
USPC ............. 714/723, 720, 777, 764; 713/193
See application file for complete search history.

(56) References Cited

U.S. PATENT DOCUMENTS

| | | | | |
|---|---|---|---|---|
| 5,715,428 | A * | 2/1998 | Wang et al. | 711/141 |
| 6,513,095 | B1 * | 1/2003 | Tomori | 711/103 |
| 7,165,206 | B2 * | 1/2007 | Lee et al. | 714/763 |
| 7,240,277 | B2 * | 7/2007 | Anderson et al. | 714/805 |
| 2004/0268332 | A1 * | 12/2004 | Mitsumori et al. | 717/154 |
| 2005/0212656 | A1 * | 9/2005 | Denison et al. | 340/5.73 |
| 2007/0074048 | A1 * | 3/2007 | Rudelic et al. | 713/193 |

* cited by examiner

*Primary Examiner* — Guy Lamarre
(74) *Attorney, Agent, or Firm* — Robert D. Marshall, Jr.; W. James Brady; Frederick J. Telecky, Jr.

(57) ABSTRACT

A memory validation manager reserves a block of time for exclusive accesses to a memory bank having lines of memory for which validation codes provide a degree of error detection and correction for each memory line. The memory validation manager reads, processes, and corrects at least some of the contents of each memory line based on indications of validity encountered for each memory line. New data is written in response to a validation code. Likewise, a valid field for each line can be updated and a new validation code written for a memory when the valid field indicates that a validation code has not yet been written for a memory line. The memory validation manager processes data read from a first memory line while either reading or writing to another memory line to minimize the latency of the process of scrubbing memory lines.

20 Claims, 6 Drawing Sheets

MEMORY CONTROLLER WITH AUTOMATIC ERROR DETECTION AND CORRECTION

CLAIM OF PRIORITY

This application for Patent claims priority to U.S. Provisional Application No. 61/387,367 entitled "Combined integer to floating point conversions with varied precision formats" filed Sep. 28, 2010, and claims priority to U.S. Provisional Application No. 61/384,932 entitled "Prefetch Stream Filter with FIFO Allocation and Stream Direction Prediction" filed Sep. 21, 2010, wherein the applications listed above are incorporated by reference herein.

BACKGROUND

The occurrence of soft errors in memory is a major reason for failures in the processing of the computing applications. These soft errors often occur due to random incidental radiation that changes the electrical charge in one or more bit cells within the memory. Convention solutions store one or more parity bits along with data to detect such errors but often do not detect and report in a timely fashion sufficient data to provide an error response suitable for timing-critical computing applications.

The problems noted above are solved in large part by a memory system that relatively quickly "scrubs" such errors when possible. The disclosed memory validation manager reserves a block of time for exclusive accesses to a memory bank having lines of memory for which validation codes provide a degree of error detection and correction for each memory line. The memory validation manager reads, processes, and corrects at least some of the contents of each memory line based on indications of validity encountered for each memory line. New data is written in response to a validation code. Likewise, a valid field for each line can be updated and a new validation code written for a memory when the valid field indicates that a validation code has not yet been written for a memory line. The memory validation manager processes data read from a first memory line while either reading or writing to another memory line to minimize the latency of the process of scrubbing memory lines.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used (throughout the following description and claims) to refer to particular system components. As one skilled in the art will appreciate, various names can be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be through a direct electrical connection, or through an indirect electrical connection via other devices and connections. As used herein, a single device that is coupled to a bus (which includes one or more signals) can represent all instances of the devices that are coupled to each signal of the bus.

Figure 1:
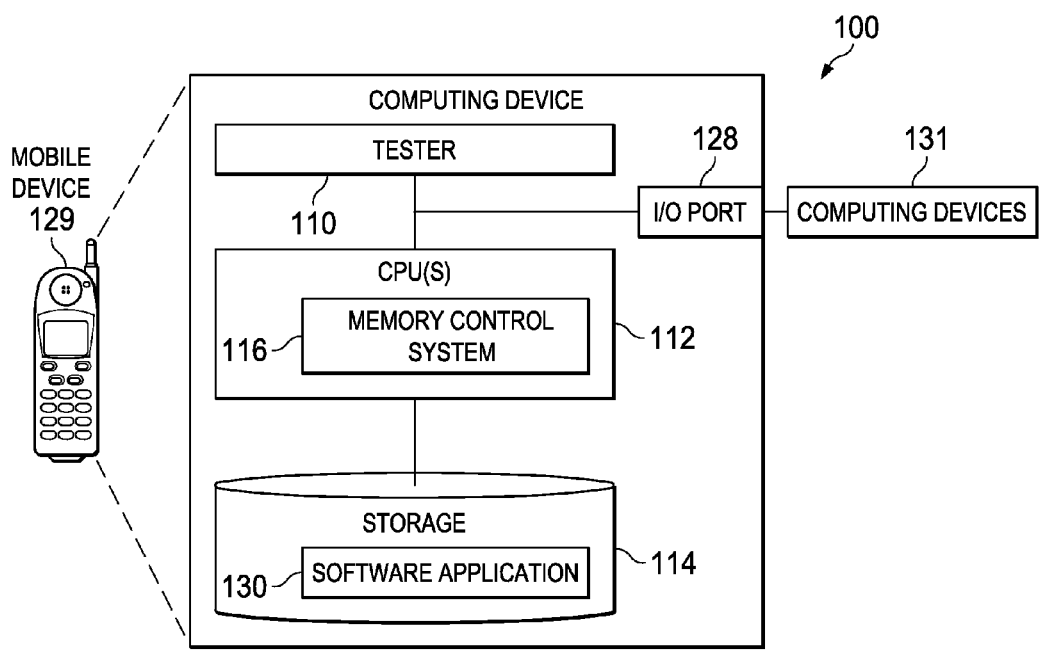
FIG. 1 depicts an illustrative computing device 100 in accordance with embodiments of the disclosure.

FIG. 1 depicts an illustrative computing device 100 in accordance with embodiments of the disclosure. The computing device 100 is, or is incorporated into, a mobile communication device 129 (such as a mobile phone or a personal digital assistant such as a BLACKBERRY® device), a personal computer, automotive electronics, or any other type of electronic system.

In some embodiments, the computing device 100 comprises a megacell or a system-on-chip (SoC) which includes control logic such as a CPU 112 (Central Processing Unit), a storage 114 (e.g., random access memory (RAM)) and tester 110. The CPU 112 can be, for example, a CISC-type (Complex Instruction Set Computer) CPU, RISC-type CPU (Reduced Instruction Set Computer), or a digital signal processor (DSP). The storage 114 (which can be memory such as SRAM (static RAM), flash memory, or disk storage) stores one or more software applications 130 (e.g., embedded applications) that, when executed by the CPU 112, perform any suitable function associated with the computing device 100. The tester 110 comprises logic that supports testing and debugging of the computing device 100 executing the software application 130. For example, the tester 110 can be used to emulate a defective or unavailable component(s) of the computing device 100 to allow verification of how the component(s) operate, were it actually present on the computing device 100, would perform in various situations (e.g., how the component(s) would interact with the software application 130). In this way, the software application 130 can be debugged in an environment which resembles post-production operation.

The CPU 112 typically comprises memory and logic which store information frequently accessed from the storage 114. Various subsystems (such as the CPU 112 and/or the storage 114) of the computing device 100 include one or more memory control systems 116, which are used to control certain memory operations during the execution of the software application 130.

Memory control system 116 employs static random access memories (SRAMs) that are formed using deep sub-micron technologies. Because of the relatively small amount of charge that is used to store a memory state in such technologies, an incident alpha particle (or other high energy particle) can induce a change in the amount of charge stored, and thus cause a "soft error." Soft errors are increasingly encountered as the technologies used to form the SRAMs use ever smaller feature sizes. Various schemes such as error detection and correction (EDC) codes are used to detect, and to variously correct, the soft errors that increasingly occur.

A redundant encoding scheme (such as a Hamming code) is used to validate the data that is to be stored in the SRAM. Typically, extra bits are arranged and stored to provide redundancy for the data stored in SRAM. When the SRAM is subsequently read, the redundancy information is analyzed to determine whether any bits (in the data or validation code) that were stored have been (e.g., unintentionally) modified.

The amount of redundancy incorporated in an EDC scheme determines the number of errors that can be detected (and the number of errors that can be corrected) in a line of memory. For example, a two-bit detection/one-bit correction scheme allows a single-bit error to be detected and corrected. However, when a double-bit error occurs, then the change in the two bits can be detected as an error, but the correct value for the bits cannot be determined from the stored redundant encoded information (which causes a memory fault). If more than two bits are changed by a soft-error, then the validity output of the SRAM is questionable (e.g., an error may or not be detected, much less corrected).

Disclosed herein are techniques for reducing the processing time that is encountered when using such schemes for detecting and correcting memory errors (such as the soft errors discussed above). A memory verification manager 240 (discussed below with reference to FIG. 2) is a portion of the memory control system 116 that is used to implement the disclosed techniques.

Figure 2:
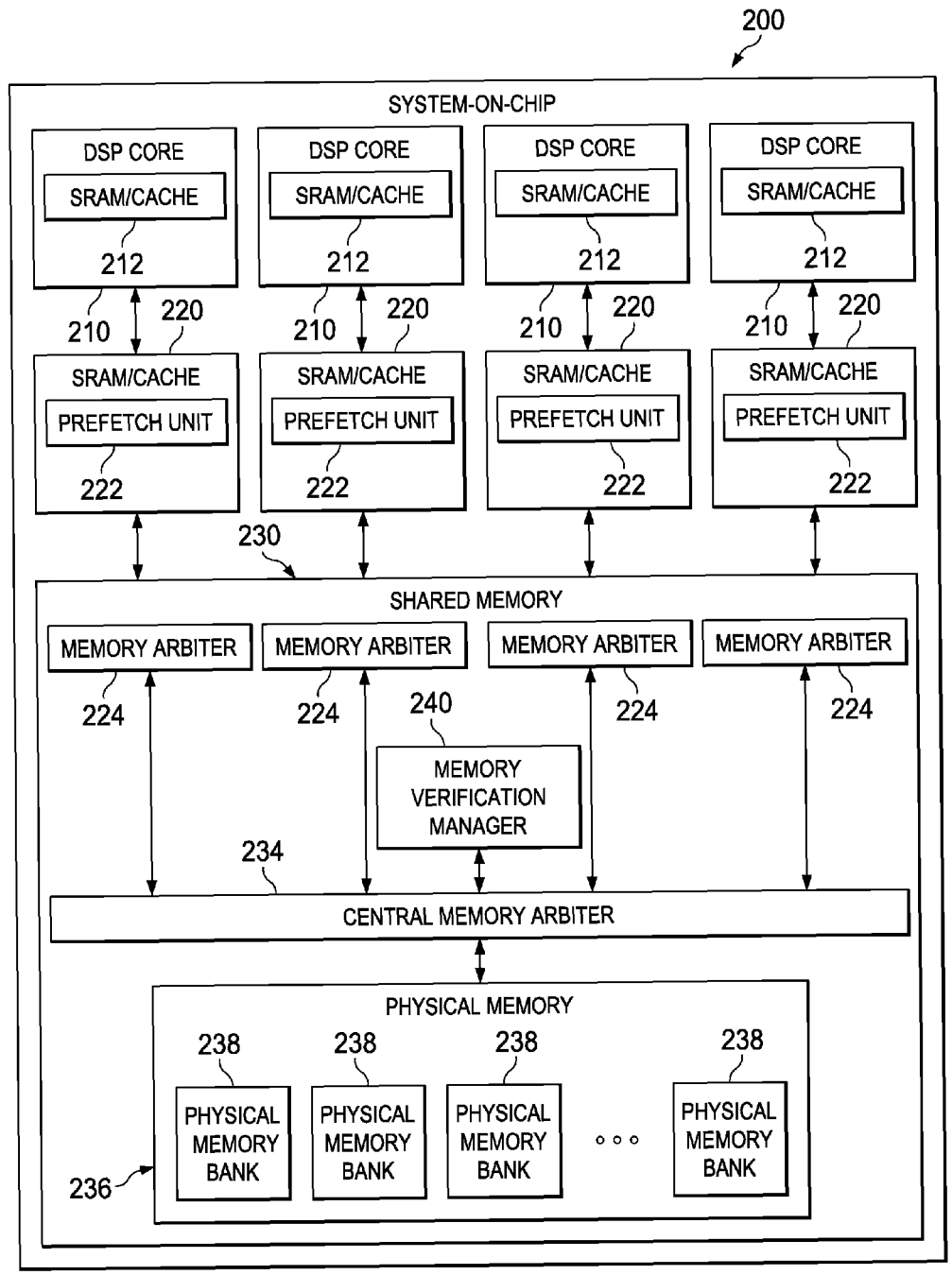
FIG. 2 is a block diagram illustrating a computing system including a memory verification manager in accordance with embodiments of the disclosure.

FIG. 2 is a block diagram illustrating a computing system including a memory verification manager in accordance with embodiments of the disclosure. Computing device 100 is illustrated as an SoC 200 that includes one or more DSP cores 210, L2 SRAM/Caches 220, and shared memory 230. Although the illustrated elements of the computing system 200 are formed using a common substrate, the elements can also be implemented in separate substrates, circuit boards, and packages (including the shared memory 230).

Each DSP core 210 optionally includes a prefetch unit 222 for prefetching data for, for example, a level-one data cache such as L1 SRAM/Cache 212 and/or a level-two cache such as SRAM/Cache 220. Each DSP core 210 has a local memory such as L2 SRAM/Cache 220 to provide relatively quick access to read and write memory. Additionally, each DSP core 210 is coupled to a shared memory 230, which usually provides slower (and typically less expensive) memory accesses than SRAM/Cache 220. The shared memory 230 stores program and data information that can be shared between each DSP core 210.

In various embodiments, each DSP core 210 is associated with a local memory arbiter 224 for reordering memory commands in accordance with a set of reordering rules. Thus, memory requests from differing streams from different processors are each arbitrated in accordance with each local level before the memory requests before sending the memory requests to a central memory arbiter 234. The central memory arbiter 234 is arranged to control memory accesses for a shared memory (such as physical memory 236), where the memory access are generated by differing "cores" (e.g., processors) that do not share a common (local) memory arbiter 224. The central memory arbiter is arranged to cancel (e.g., squash) pending, speculative prefetches on an as-needed (or as-desired) basis in accordance with policies for determining processor priority (e.g., vis-à-vis other processors and direct memory access devices). Physical memory 236 typically is arranged as banks of memory, such as physical memory banks 238.

Memory verification manager 240 is normally given a highest priority access to the physical memory 236 by the central memory arbiter 234 because of the importance of correcting and validating the data stored in memory. Memory verification manager 240 is arranged to "scrub" portions of memory periodically to validate validation codes (such as EDC codes and memory line valid bits) for a corresponding memory line. The memory range of scrubbing and the rate of iterations are stored in programmable registers and/or selected in response to a metric of system performance. A metric of system performance is determined in accordance with operating metrics such as error rate detection, the rate of non-correctable errors encountered, the percentage of set (e.g., valid) data valid bits (discussed below) for memory lines in a specified memory line, operating voltage, operating temperature, various operating modes, and the like.

In an embodiment where EDC schemes are not sufficient to perform corrections upon memory lines where multiple errors accumulate, memory verification manager 240 polls a range of memory on a periodic basis. The length of the period is selected to help ensure that the number of errors accumulated in a memory line between scrubs does not exceed a threshold where the errors in the memory line can no longer be corrected. For example, a performance metric measuring the number of soft errors encountered in a range of memory (e.g., either the entire memory range or a smaller portion of the memory range) over a period of time is used to determine an error rate for estimating a period of time over which the memory lines are scrubbed at a rate that helps ensure that the number of accumulated memory errors for a memory line does not exceed the correctability threshold.

In an embodiment where each memory line has a corresponding valid bit that is used to indicate that the EDC code is prima facie incorrect (e.g., as a result of no correct code being initially stored for the corresponding memory line), memory verification manager 240 polls a range of memory on a period basis to (re-) activate the EDC scheme for the corresponding memory line. As described in U.S. Pat. No. 7,240,277 (which is hereby incorporated by reference), a valid bit that corresponds to a memory is used to indicate when an EDC code has not been written for the data stored in a memory. Accordingly, a write of data to a sub-portion of a memory line (that is less than the width of the data portion that is protected by the EDC code) can be relatively quickly written (by not having to wait for the processing required for generating and updating the EDC code). This technique avoids always having to perform a read-modify-write cycle that is used to update the EDC code, which takes a longer period of time to execute. The longer update period can substantially slow the execution of an algorithm (for example) that clusters writes in sub-portions of a memory line (because the entire data portion of the memory line is read in order to generate the corresponding EDC code for the entire line).

Figure 3:
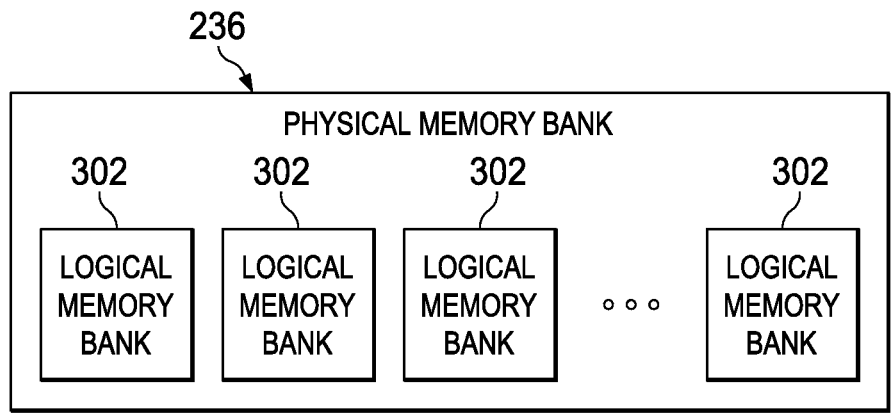
FIG. 3 is a block diagram illustrating logical memory banks that are arranged in a physical memory bank in accordance with embodiments of the disclosure.

FIG. 3 is a block diagram illustrating logical memory banks that arranged in a physical memory bank in accordance with embodiments of the disclosure. Physical memory bank 236 includes one or more logical memory banks 302 arranged therein. An example logical memory bank 302 is discussed below with respect to FIG. 4.

Figure 4:
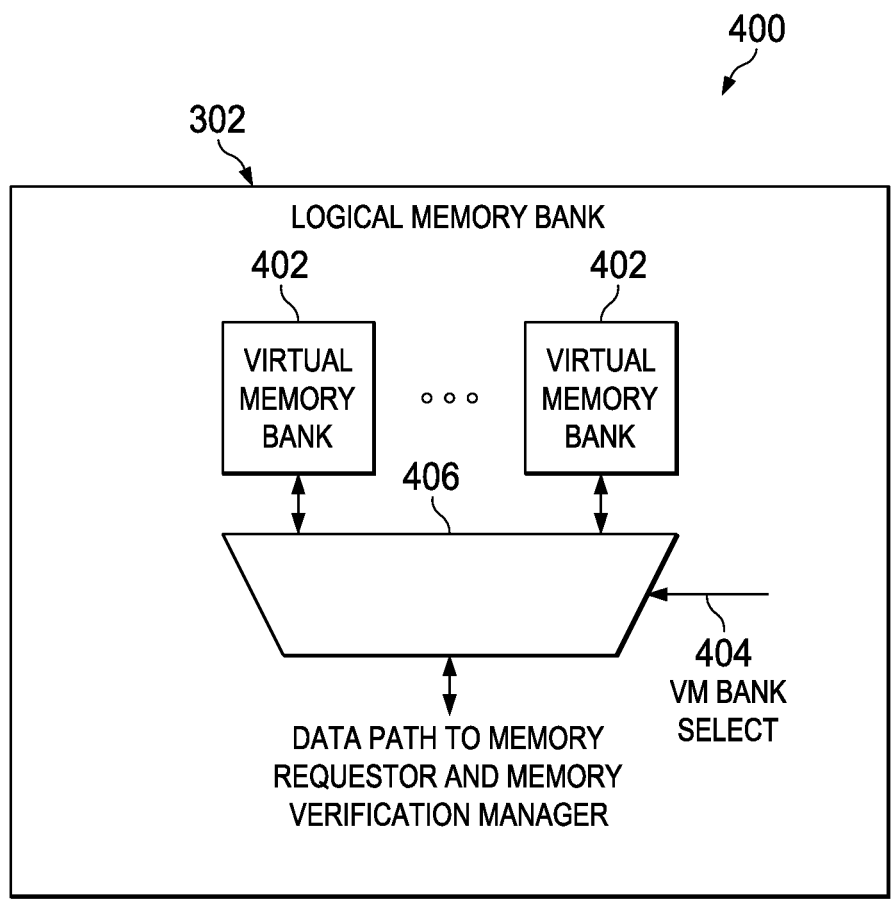
FIG. 4 is a block diagram illustrating a logical memory bank in accordance with embodiments of the present disclosure.

FIG. 4 is a block diagram illustrating a logical memory bank in accordance with embodiments of the present disclosure. Logical memory bank 302 includes two or more virtual memory banks 402. In low voltage applications, overlapping memory accesses to the virtual memory banks 402 are scheduled such that each virtual memory bank appears to have a response time only one clock cycle. Each virtual memory a 402 is selected by applying a virtual memory (VM) select signal 404 to a control input of multiplexer 406. In an embodiment, the VM select signal alternates between selecting between the outputs of two virtual memory banks 402, respectively. The output of multiplexer 406 is provided to, for example, a memory requestor for components of the memory verification manager 240. The timing of the overlapping virtual memory accesses is discussed below with reference to FIG. 5.

Figure 5:
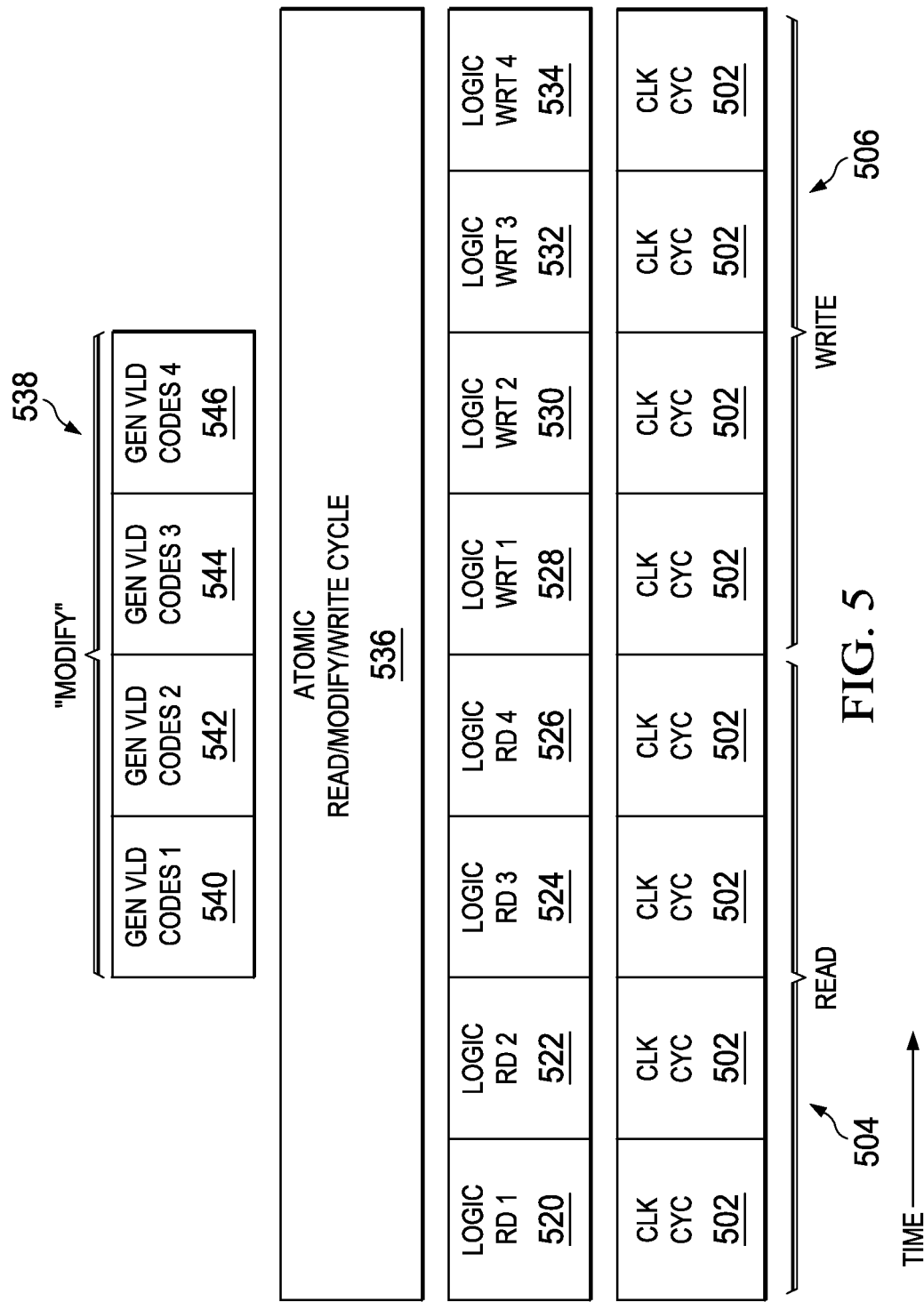
FIG. 5 is a timing diagram illustrating overlapping virtual memory accesses in accordance with embodiments of the present disclosure.

FIG. 5 is a timing diagram illustrating an atomic read-modify-write cycle for validating validation codes in accordance with embodiments of the present disclosure. For example, a block of exclusive accesses is reserved for a memory validation manager to exclusively access a logical memory bank. The block of exclusive accesses allows for data to be read from one or more memory lines, validating the validation codes for each memory line (including generating new validation codes), and writing the new validation codes without interference from other memory requestors disturbing the memory line being validated.

A periodic clock for accessing memory is illustrated as a sequence of clock cycles (CLK CYC) 502 along a horizontal axis denoting the progression of time. The first eight clock cycles are used for reading data from four memory lines (as shown by reading period 504). The next eight clock cycles are used for writing validation codes to the four memory lines (as shown by writing period 506).

During the first two clock cycles (and for each of the successive pairs of clock cycles) of reading period 504, a first virtual memory read (for LOGIC RD 1 (520)) access is overlapped with a second virtual memory read (for LOGIC RD 2 (522)). The overlapped virtual memory reads are physically overlapped in time, but virtually appear as logic memory read one (LOGIC RD 1) 520, logic memory read two (LOGIC RD 2) 522, logic memory read three (LOGIC RD 3) 524, and logic memory read four (LOGIC RD 4) 526.

During the first two clock cycles (and for each of the successive pairs of clock cycles) of writing period 506, a first virtual memory write (for LOGIC WRT 1 (528)) access is overlapped with the second virtual memory write (for LOGIC WRT 2 (530)). The overlapped virtual memory writes are physically overlapped in time, but virtually appear as logic memory write one (LOGIC WRT 1) 528, logic memory write two (LOGIC WRT 2) 530, logic memory write three (LOGIC WRT 3) 532, and logic memory write four (LOGIC WRT 4) 534.

The reading period 504 and the writing period 506 form an atomic read-modify-write cycle 536 during which exclusive access is granted to the memory verification controller 240. The length of the atomic read-modify-write cycle 536 greatly effects system performance because of the large number of memory lines to be verified in a typical memory system.

As disclosed herein, the "modify" period 538 of the atomic read-modify-write cycle 536 is executed between corresponding portions of the read period 504 and the write period 506. For example, a memory line from the first logical bank is read (during LOGIC RD 1 520), the memory line is validated and a new validation code is generated during generate validation codes one (GEN VAL CODES 1) 540, and the new validation code is written (during LOGIC WRT 1 528) to the validation portion of the memory line of the first logical memory bank. Likewise, a memory line from the second logical bank is read (during LOGIC RD 2 522), the memory line is validated and a new validation code is generated during generate validation codes two (GEN VAL CODES 2) 542, and the new validation code is written (during LOGIC WRT 2 530) to the validation portion of the memory line of the second logical memory bank. Likewise, a memory line from the third logical bank is read (during LOGIC RD 3 524), the memory line is validated and a new validation code is generated during generate validation codes three (GEN VAL CODES 3) 544, and the new validation code is written (during LOGIC WRT 3 530) to the validation portion of the memory line of the third logical memory bank. Likewise, a memory line from the fourth logical bank is read (during LOGIC RD 4 526), the memory line is validated and a new validation code is generated during generate validation codes four (GEN VAL CODES 4) 544, and the new validation code is written (during LOGIC WRT 4 532) to the validation portion of the memory line of the fourth logical memory bank.

More or less (as few as two) logical memory banks can be used in accordance with processing requirements and the size of the physical (and/or logical) memory banks to be validated. In an embodiment where just two logical memories are to be verified, a LOGIC RD 1 operation (for example, reading a memory line from a first logical memory) is followed by a LOGIC RD 2 operation. A GEN VAL CODES 1 operation (for example, generating a new validation code for the memory line from the first logical memory bank) is concurrently executed with the LOGIC RD 2 operation. The LOGIC RD 2 operation is followed by a LOGIC WRT 1 operation (where, for example, the new generation code is written to a memory line in the first logical memory). A GEN VAL CODES 2 operation is executed concurrently with the LOGIC WRT 1 operation. The LOGIC WRT 1 operation is followed by a LOGIC WRT 2 operation.

Figure 6:
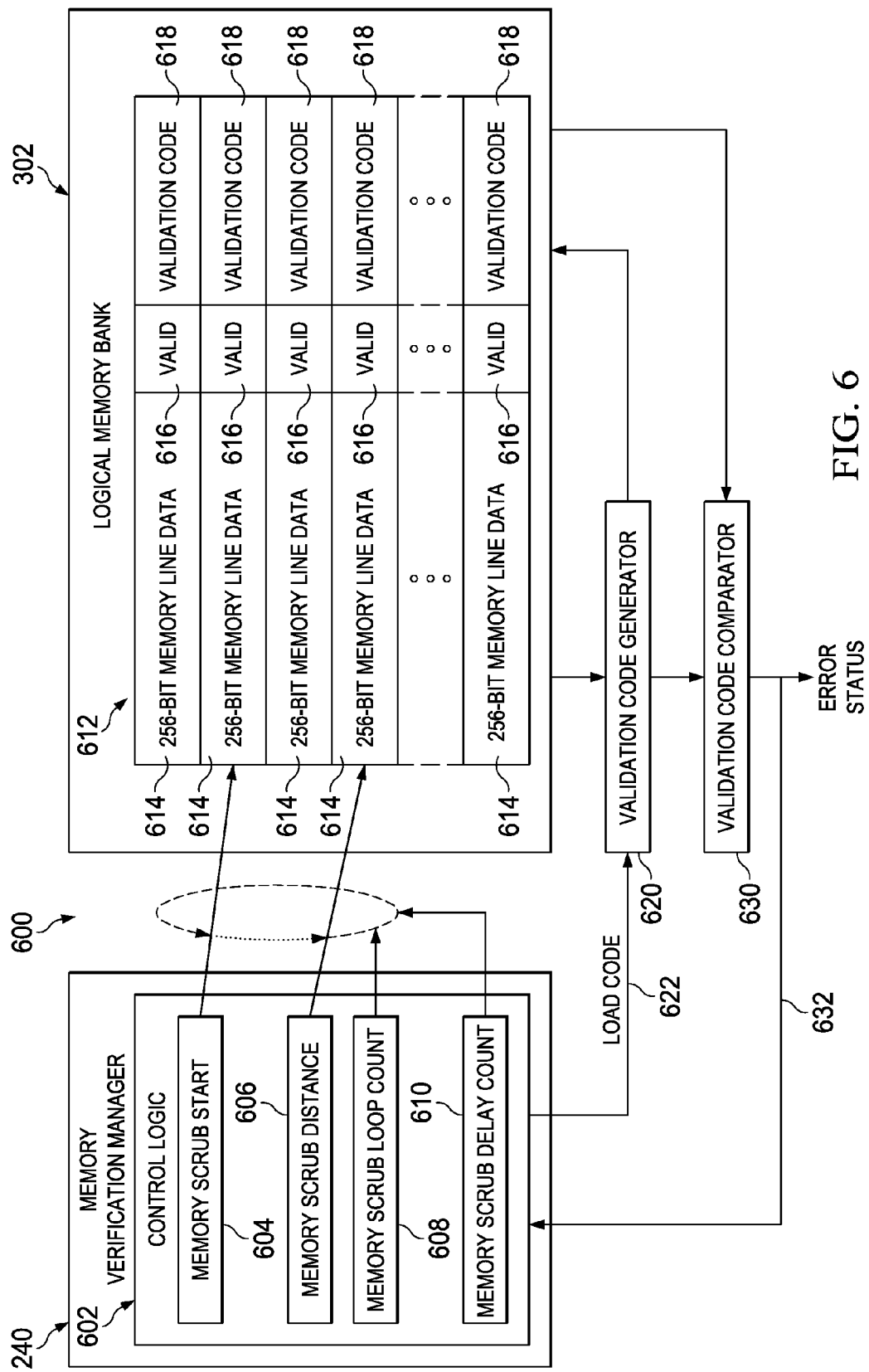
FIG. 6 is a block diagram illustrating a memory validation system in accordance with embodiments of the present disclosure.

FIG. 6 is a block diagram illustrating a memory validation system in accordance with embodiments of the present disclosure. Memory validation system 600 includes a logical memory bank 302 and memory verification manager 240. As discussed above, at least two logical memory banks 302 are used in performing atomic read-modify-write cycle for validating validation codes using operations on a first logical memory that at least partly overlap operations being executed for a second logical memory.

Logical memory bank 302 includes an array 612 of memory line data 614, each of which is associated with a valid bit (or field) 616 and validation code 618. The memory line data 614 of the memory lines typically have a predetermined data length such as 256 bits long. Valid bit 616 indicates whether the validation code 618 have been generated for the data written to the memory line data 614. Validation code 618 is typically selected to be sufficient to correct a plurality of memory errors in the corresponding memory line data 614.

Memory verification manager 240 includes control logic 602 that is arranged to control parameters of scrubbing logical memory banks. In an embodiment, the control logic 602 is arranged to control the scrubbing of a plurality of logical memory banks; in various embodiments, portions of the control logic 602 are replicated and individually assigned to a respective logical memory bank.

Control logic 602 includes a memory scrub start 604 register, a memory scrub distance 606 register, a memory scrub loop count 608 register, and a memory scrubbed delay count 610 register. Memory scrub start 604 register that is arranged to specify a starting address of a range of memory lines to be scrubbed. Memory scrub distance 606 register is arranged to specify the distance (or ending address) of the range of memory lines to be scrubbed. Memory scrub loop count 608 register is arranged to specify the number of times that the scrubbing operation is to be performed upon the defined range of memory lines. The memory scrub delay count 610 register is arranged to specify an interval between each scrubbing loop. Accordingly, the size of the range of memory to be scrubbed, the number of times the scrubbing operation is to be performed, and the delay between loops of the scrubbing operation affect the availability for other memory requestors of the memory banks containing the memory being scrubbed. Typically, the central memory arbiter 234 assigns priority for accesses to the memory verification manager 240.

In operation, memory verification manager 240 receives an indication in response to a read verification of a memory line data 614 of whether the corresponding validation code is valid. The indication can be generated in response to a determination that the memory line data 614 is not in agreement with the corresponding validation code 618 (e.g., when soft errors occur).

The determination is made when the memory line data 614 of a selected memory line is provided to a validation code generator 620 for generation of a new validation code. Validation code comparator 630 is arranged to compare the new validation code with validation code 618 and to provide the indication (such as by providing an error status at node 632) when an error is encountered in the comparison. The error status indicates, for example, that no error has been encountered, that an error has been encountered and is correctable, or that an error has been encountered and is not correctable.

When the indication of the validation code associated with a first memory line is invalid (e.g., as a result of a soft error in memory line data 614) is received, newly regenerated data (generated using the corresponding validation code) is written to the corresponding (of the selected memory line) memory line data 614.

The corresponding valid bit 616 is set (if necessary) to indicate the data associated with the selected memory line is valid (or when a new validation code has been written to the corresponding validation code 618 as described immediately below).

The memory verification manager 240 also receives an indication that is be generated in response to a determination that the corresponding valid 616 bit indicates that validation code 618 has not been generated for the memory line data 614. When the indication of the validation code associated with a first memory line is valid is received due to the valid bit 616 indicating an invalid state, the control logic 602 asserts signal "load code" 622. In response to the assertion of signal load code 622, validation code generator 620 writes the newly generated validation code to the corresponding (of the selected memory line) validation code 618.

The corresponding valid bit 616 is set to indicate the new validation code associated with the selected memory line is valid (because a new validation code has been written to the corresponding validation code 618).

Figure 7:
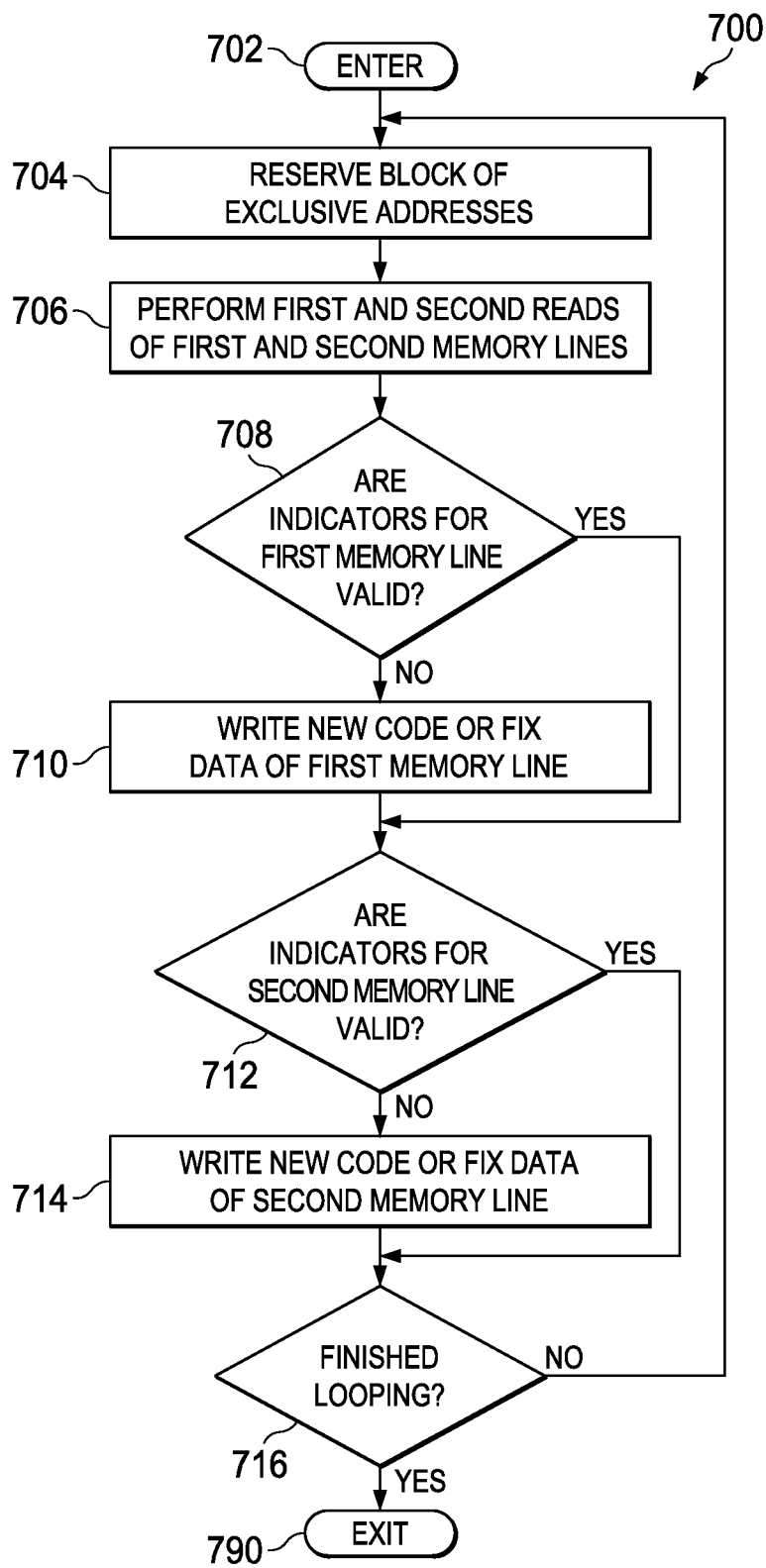
FIG. 7 is a process diagram illustrating automatic error detection and correction scheme in accordance with embodiments of the present disclosure.

FIG. 7 is a process diagram illustrating automatic error detection and correction scheme in accordance with embodiments of the present disclosure. Process 700 is entered at node 702 and proceeds to function 704. At function 704, a block of exclusive accesses is reserved for a memory validation manager to exclusively access a logical memory bank. The block of exclusive accesses allows for data to be read from one or more memory lines, validating the validation codes for each memory line (including generating new validation codes), and writing the new validation codes without interference from other memory requestors disturbing the memory line being validated.

In function 706, a first read of a first memory line is performed (for example, reading a memory line from a first logical memory and the corresponding valid bit and validation code) and is followed by second read of a second memory line. While processing a read or write operation for a memory line other than the first memory line, a new validation code for the read memory line is generated and compared with the validation line stored for the memory line. Likewise the data status bit for the first memory line is concurrently evaluated with the second memory line read operation.

In function 708, if the validation code (and the data valid bit) of the first memory line is valid, the process flow continues at function 712; if the validation code (or the data valid bit) is invalid, the process flow continues at function 710.

At function 710, the second read operation is followed by a first write operation. The first write operation writes the newly generated validation code to the corresponding validation code of the first memory line in the event of a valid bit indicating that a validation code has not yet been written. Alternatively, the newly regenerated data from the corresponding validation code is written to the data portion of the first memory line if the stored data is in conflict with the stored validation code. While processing a read or write operation for a memory line other than the second memory line, a new validation code for the read second memory line is generated and compared with the validation line stored for the second memory line. Likewise the data status bit for the second memory line is evaluated during the time reserved for the writing of the newly generated validation code for the first memory line.

In function 712, if the validation code (and the data valid bit) is valid, the process flow continues at function 716; if the validation code (or the data valid bit) is invalid, the process flow continues at function 714.

At function 714, the first write operation (if any) is followed by a second write operation. The second write operation writes the newly generated validation code to the corresponding validation code of the second memory line in the event of a valid bit indicating that a validation code has not yet been written. Alternatively, the newly regenerated data from the corresponding validation code is written to the data portion of the second memory line if the stored data is in conflict with the stored validation code.

In function 716, looping values are adjusted (such as by incrementing or decrementing) and compared to determine the range of a loop for validating the validation codes and valid bits, the number of loops to be performed and a delay period after the end of one loop and the beginning of the next loop. If the extent, the number of loops, and the delay between loops have been completed, the process proceeds to node 790, when the process ends; otherwise the process returns to function 704.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for validating memory codes in memory banks, comprising:

reserving a block of exclusive accesses for a memory validation manager to exclusively access a logical memory bank, wherein the logical memory bank includes a plurality of memory lines of a predetermined data length, and wherein the block of block of exclusive accesses includes a first read operation of a first memory line in the logical memory bank, which is followed by a second read operation of a second memory line in the logical memory bank, which in turn is followed by a first write operation of the first memory line in the logical memory bank, which in turn is followed by a second write operation of the second memory line in the logical memory bank;

determining whether an indication is received in response to the first read operation that the validation code associated with the first memory line is valid or is invalid; and if the indication that the validation code associated with the first memory line is invalid, generating validity information from stored information received during the first read operation and storing the generated validity information during the first write operation.

2. The method of claim 1, wherein the indication that the validation code associated with the first memory line is valid is generated in response to the first corresponding valid bit being set to indicate the validation code of the first memory line is invalid, and wherein the generated validity information is a validation code generated in response to information from a data portion of the first memory line and is a validity bit for indicating a validation code has been generated for validating the data stored in the data portion of the first memory line.

3. The method of claim 1, wherein the indication that the validation code associated with the first memory line is valid is generated in response to the validation code associated with the first memory line being compared with the first new validation code, and wherein the generated validity information is data regenerated in response to the validation code associated with the first memory line.

4. The method of claim 1, wherein the indication that the validation code associated with the first memory line is valid is generated in response to a first corresponding valid bit being set to indicate the validation code of the first memory line is invalid or wherein the indication that the validation code associated with the first memory line is valid is generated in response to the validation code associated with the first memory line being compared with the first new validation code.

5. The method of claim 1, comprising determining whether an indication is received in response to the second read operation that the validation code associated with the second memory line is invalid, and associating a second new validation code with the second memory line when the second new generation code is generated in response to an evaluation of a data portion of the second memory line, and setting a corresponding valid bit if the second new validation code associated with the second memory line is valid.

6. The method of claim 5, wherein the indication that the validation code associated with the second memory line is valid is generated in response to the corresponding valid bit being set to indicate the validation code of the second memory line is invalid, or wherein the indication that the validation code associated with the second memory line is valid is generated in response to the validation code associated with the second memory line being compared with the second new validation code.

7. The method of claim 1, wherein validation code is a Hamming code.

8. The method of claim 7, wherein the Hamming code includes information that is sufficient to detect all soft errors in the data portion of a memory line, but is not sufficient to correct all soft errors in the data portion of the memory line.

9. The method of claim 1, wherein the logical memory includes virtual memory banks, wherein each virtual memory bank is accessed during a single memory clock cycle.

10. The method of claim 1, wherein the logical memory is a portion of a physical memory bank of a static random access memory (SRAM) that is formed in a substrate of an integrated circuit that is arranged to perform the method of claim 1.

11. The method of claim 1, comprising performing the method of claim 1 upon a range of memory lines in the logical memory banks.

12. The method of claim 1, comprising performing the method of claim 1 in loops upon a range of memory lines in the logical memory banks for a number of times that is specified in a loop counter, wherein an interval between each loop is specified in a delay counter, wherein a delay value for the delay counter is selected in response to the magnitude of a performance metric of the logical memory bank or the physical memory in which the logical memory bank is arranged.

13. A memory system, comprising:
a logical memory bank arranged to store and retrieve data, wherein the logical memory bank includes a plurality of memory lines of a predetermined data length, wherein each memory line includes a data portion, a corresponding valid bit, and a validation code;
a validation code generator that is arranged to receive the data portion from a first memory line during a first read operation and to generate a new validation code in response to the received data portion;
a validation code comparator that is arranged to compare the new validation code and the validation code of the first memory line and to produce an indication whether the validation code of the first memory line is valid or is invalid; and
a memory verification manager that is arranged to select the first memory line and, in response to the indication of an invalid code corresponding to the first memory line, to cause the new validation information to be loaded into a portion of the first memory line and to cause the corresponding valid bit to be set during a first write operation of the first memory line, wherein the memory manager reserves exclusive access of the logical memory bank, and wherein the first read operation of the first memory line occurs before a second read operation of a second memory line, wherein the second read operation occurs before the first write operation of the first memory line, wherein the first and second read operations and the first write operation occur during a period of time in which the memory verification manager has reserved exclusive access to the logical memory.

14. The system of claim 13, wherein the new validation information is data regenerated from a validation code or is a validation code generated in response to the corresponding valid bit indicating that the validation code stored in the corresponding memory line has not been written or is otherwise invalid.

15. The system of claim 13, wherein the indication of an invalid code corresponding to the first memory line is generated in response to the first corresponding valid bit being set to indicate the validation code of the first memory line is invalid, or in response to the validation code associated with the first memory line being compared with the first new validation code, wherein the new validation code is not arranged to provide the same resulting data as the validation code associated with the first memory line.

16. The system of claim 13, wherein the validation code generator is arranged to generate a Hamming code in response to the received data portion of a memory line.

17. The system of claim 13, wherein the memory verification manager comprises a first register that determines a start address for validating the validation codes in memory lines, a second register that determines a number of memory lines for validating the validation codes, a third register that determines the number of times that a validation loop is to be performed on a range of memory lines that is determined by the first and second register, and a fourth register that determines an interval between successive validation loops.

18. A memory verification manager, comprising:
- a validation code generator that is arranged to generate new validation information in response to a data portion of a first memory line;
- a validation code comparator that is arranged to determine whether an indication is received in response to the first read operation that the validation code associated with the first memory line is valid; and
- control logic that is arranged to reserve a block of exclusive accesses for the memory validation manager to exclusively access a logical memory bank, wherein the logical memory bank includes a plurality of memory lines of a predetermined data length, and wherein the block of exclusive accesses includes a first read operation of the first memory line in the logical memory bank, which is followed by a second read operation of a second memory line in the logical memory bank, which in turn is followed by a first write operation of the first memory line in the logical memory bank, which in turn is followed by a second write operation of the second memory line in the logical memory bank, wherein during the first write operation the first new validation code is associated with the first memory line and a first corresponding valid bit is set to valid.

19. The memory verification manager of claim 18, wherein the indication of an invalid code corresponding to the first memory line is generated in response to the first corresponding valid bit being set to indicate the validation code of the first memory line is invalid or in response to the validation code associated with the first memory line being compared with the first new validation code, wherein the new validation information is data regenerated from a validation code or is a validation code generated in response to the corresponding valid bit indicating that the validation code stored in the corresponding memory line has not been written or is otherwise invalid.

20. The memory verification manager of claim 19, wherein the memory verification manager comprises a first register that determines a start address for validating the validation codes in memory lines, a second register that determines a number of memory lines for validating the validation codes, a third register that determines the number of times that a validation loop is to be performed on a range of memory lines that is determined by the first and second register, and a fourth register that determines an interval between successive validation loops.

* * * * *